July 25, 1967 F. D. NEU 3,333,180
NONLINEAR RESISTANCE CIRCUIT FOR TRIPLING INPUT SIGNAL FREQUENCY
Filed June 9, 1964 2 Sheets-Sheet 1

INVENTOR.
FRANKLIN D. NEU
BY
Roland A. Anderson
ATTORNEY.

INVENTOR.
FRANKLIN D. NEU
BY
Roland A. Anderson
ATTORNEY.

3,333,180
Patented July 25, 1967

3,333,180

NONLINEAR RESISTANCE CIRCUIT FOR TRIPLING INPUT SIGNAL FREQUENCY

Franklin D. Neu, Richmond, Calif., assignor to the United States of America as represented by the United States Atomic Energy Commission Filed June 9, 1964, Ser. No. 373,891
1 Claim. (Cl. 321—69)

ABSTRACT OF THE DISCLOSURE

This invention is an electronic circuit utilizing a nonlinear resistance to triple the frequency of an input signal. The nonlinear resistance is used to produce a third harmonic component in an input signal, the first harmonic then being subtracted from the third harmonic containing signal to leave only the third harmonic signal at the output. The nonlinear resistance has a symmetrical, smoothly varying current-voltage characteristic.

Figure 1:
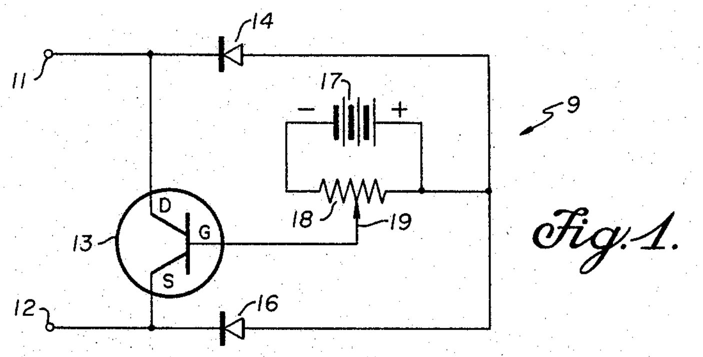

The present invention relates generally to semiconductor circuitry and more particularly to a semiconductor circuit for obtaining a nonlinear resistance and which has a resistance characteristic that can be dynamically controlled by a control bias voltage. The invention described herein was made in the course of, or under, Contract W–7405–eng–48 with the Atomic Energy Commission.

The nonlinear resistance circuit of the present invention provides a two terminal resistance which is caused to vary according to the impressed voltage level and with change in a control bias potential. Such a resistance characteristic is useful in many diverse types of electronic apparatus. For instance, the nonlinear resistance circuit can be used in various configurations with a standard amplifier to obtain function generators for controllably altering the waveform of an input signal. The nonlinear resistance circuit is also used as an essential element of a nonresonant frequency tripler, that is, the frequency of input signals may be varied over a wide range without need for adjustment of the tripler circuitry since no resonant circuits are included. The nonlinear resistance circuit can also be used in an output level regulator circuit for maintaining a constant output signal level from an amplifier.

The nonlinear resistance circuit of the present invention is further useful, for example, with such diverse apparatus as servo systems and voice amplitude compressors in radio-communication equipment. In a servo system, the present invention can be utilized to obtain a smooth transition between high speed and slow speed operation. In radio-communications, the invention can be utilized to compress the dynamic range and thus prevent over-modulation and avoid consequent adjacent channel interference. The smooth volt-ampere characteristic curve of the invention avoids undue distortion in the modulating signal.

In the circuit of the present invention, a field effect or unipolar transistor is utilized to obtain a two terminal resistance. Such a transistor generally has a central cylinder of an N-type material with electrical connection being made at each end of the cylinder, such connections being called the source and drain terminals. A ring of P-type material encircles the mid-portion of the shaft and connection thereto is referred to as the gate terminal. The low resistance through the N-type material between the source and drain connections is varied by altering the potential at the gate terminal. The gate terminal potential is negatively biased with respect to the source and drain terminals, thereby creating a centrally located depletion layer on each side of the junction between the P and N type materials. Since the depletion layer forms mainly in the N-type material and has hight resistance, the reduction in the cross-sectional area of the highly conductive N-type material raises the resistance between the source and drain terminals.

An input signal to be modified is connected in series with the source and drain terminals of the field effect transistor. A control signal derived from the input signal is applied to the gate terminal to vary the resistance of the transistor. By altering the amplitude of the gate control signal, the resistive characteristics of the circuit are controllable.

It is an object of the present invention to provide a new nonlinear resistance circuit in which the shape of the positive and negative portions of an alternating current input signal can be symmetrically altered.

It is another object of the present invention to provide a means for symmetrically compressing the amplitude of an input signal.

It is another object of the present invention to provide a simplified function generator.

It is another object of the present invention to provide a nonresonant circuit for tripling the frequency of input signals variable over a very wide range of frequencies.

It is yet another object of the present invention to provide a circuit for symmetrically expanding the amplitude of an input signal.

Figure 2:
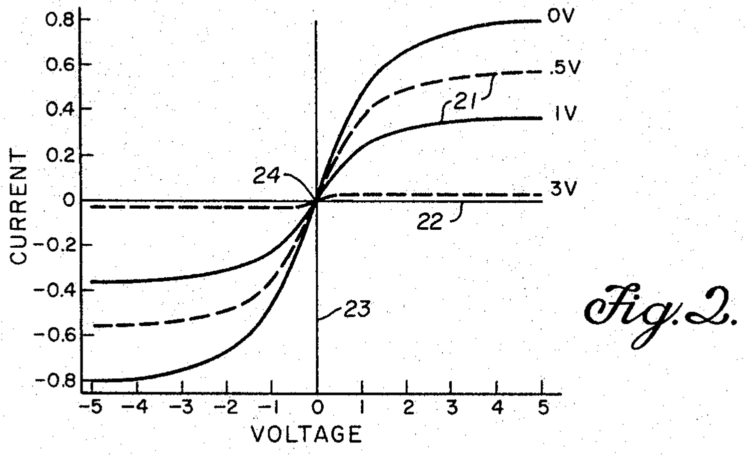
Figure 3:
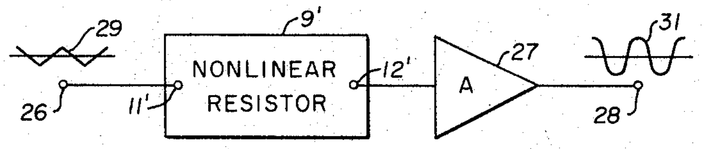
Figure 4:
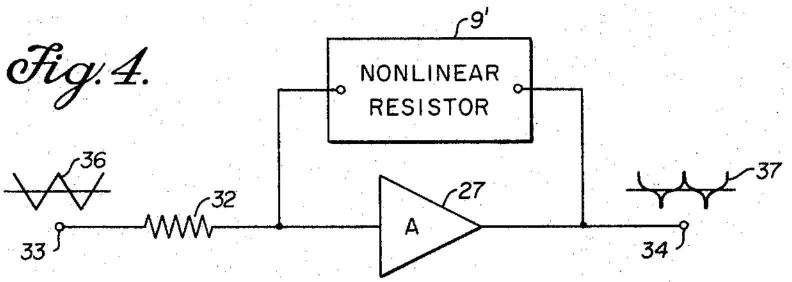
Figure 5:
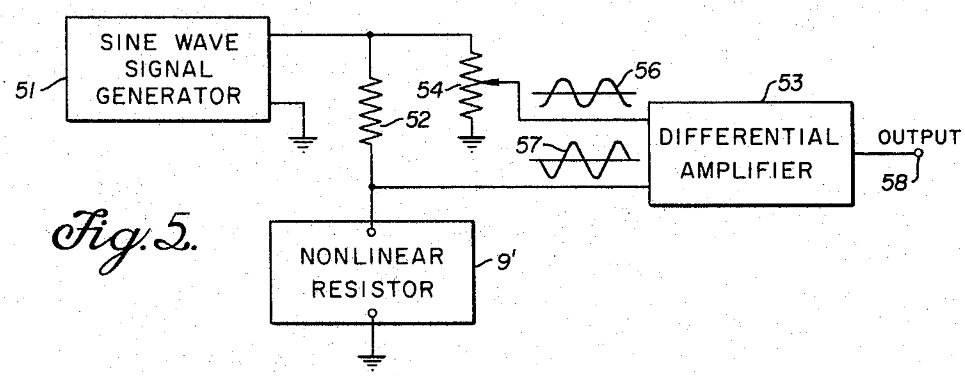
Figure 6:
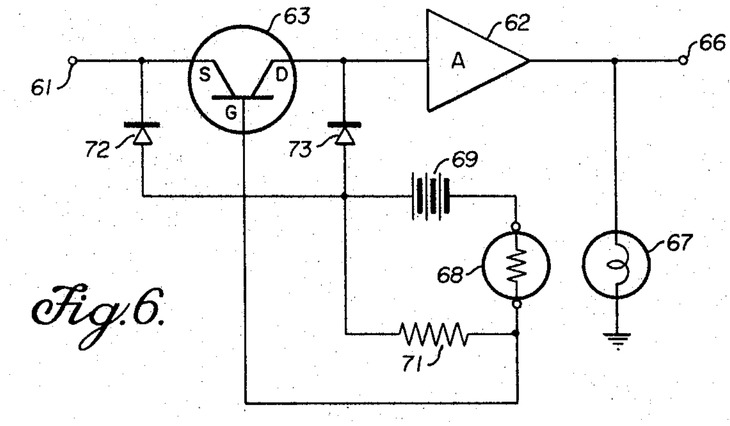

The invention will be best understood by reference to the following specification together with the accompanying drawings of which:

FIGURE 1 is a circuit diagram of basic elements of the invention,

FIGURE 2 is a family of curves of the volt-ampere characteristic for the circuit of FIGURE 1, FIGURE 3 is a block diagram of a function generator utilizing the nonlinear resistance circuit, FIGURE 4 is a block diagram of another type of function generator utilizing the nonlinear resistance circuit, FIGURE 5 is a circuit diagram for a frequency tripler utilizing the nonlinear resistance circuit, and FIGURE 6 is a circuit diagram for an automatic output level control for an amplifier and utilizing the nonlinear resistance circuit.

Referring now to FIGURE 1, there is shown a nonlinear resistance circuit 9 having a pair of input terminals 11 and 12 for convenient connection to a source of input voltage. A field effect transistor 13 has a drain and source terminal connected to the input terminals 11, 12 respectively. A pair of diodes 14 and 16 have anodes connected together while the cathodes are connected to input terminals 11, 12 respectively. An adjustable bias source is provided, comprised of a bias battery 17 connected in parallel with the resistor of a potentiometer 18. One side of the potentiometer 18 resistor is connected to the anodes of the diodes 14 and 16 while the adjustale arm 19 of the potentiometer is connected to the gate terminal of the transistor 13.

In the operation of the circuit of FIGURE 1, a fixed negative bias from the battery 17 is applied to the gate terminal of the transistor 13. The bias causes the transistor 13 to assume a corresponding resistance value. If a sine wave voltage is applied to the input terminals 11, 12, the negative portion of the sine wave is added to the bias voltage through one of the diodes 14, 16. For instance, if the applied signal causes the input terminal 11 to be negative with respect to the other input terminal 12, the potential difference therebetween is applied through the diode 14 to the gate terminal of transistor 13, being added to the bias from the battery 17. Thus, the control bias applied to the gate terminal of transistor 13 is comprised of both the bias potential from the battery 17 and the rectified input waveform. Therefore, the resistance of the transistor 13 increases as the input voltage increases.

A family of typical voltage-current curves 21 for the circuit of FIGURE 1 are shown in FIGURE 2 for various values of steady state bias voltage from the battery 17. In FIGURE 2, voltage is taken along the abscissa 22 and current along the ordinate 23. To produce the curves, a variable voltage source is connected across the input terminals 11, 12 and the current flow between the terminals measured. The curves are symmetrical about the origin 24, but the current, and thus the resistance, increase nonlinearly with an increase in voltage level of either polarity.

The nonlinear resistance circuit of FIGURE 1 can be used with other circuitry for selectively altering the shape of an input signal waveform. For instance, in FIGURE 3 there is shown a circuit which can be utilized either as a function geenrator or as a compressor for limiting the amplitude of peak amplitude voltages. The nonlinear resistor circuit 9 described in FIGURE 1 is connected with the terminals 11' and 12' thereof in series between an input terminal 26 and an amplifier 27 having an output terminal 28. Obviously, high amplitude portions of input signals will encounter relatively high resistance in the nonlinear resistor 9', thereby compressing a variable amplitude signal such as, for instance, a speech signal from a microphone connected at input terminal 26. As an example of use as a function generator, consider that a triangular wave signal 29 is applied to the input terminal 26. The amplitude peaks are suppressed as indicated by an output waveform 31, the relative amplitudes of the input and output signals not being shown here. By varying the bias voltage within the nonlinear resistor circuit 9', the degree of amplitude peak suppression is readily variable.

In a related circuit configuration shown in FIGURE 4, the nonlinear resistor circuit 9' is connected in a negative feedback circuit for the amplifier 27. An input resistor 32 is connected between an input terminal 33 and the input of the amplifier 27, and which has an output terminal 34. Such a circuit can be used as a signal expander for increasing the differential between low and high amplitude signals. Such a characteristic is also useful with servo systems for causing a servo motor to shift smoothly from high speed to low speed. In the operation of the circuit of FIGURE 4, high amplitude signals in the negative feedback loop formed by the nonlinear resistor 9' are compressed, so that high amplitude signals in the amplifier 27 are not cancelled by negative feedback to as great a degree as are low amplitude signals. Such circuitry can be utilized as a function generator to provide another class of output signals as distinguished from that of the circuit of FIGURE 3. For instance, if triangular wave 36, similar to the input signal 29 of FIGURE 3 is applied to the input 33 in FIGURE 4, an output signal 37 is produced in which the amplitude peaks of the input signal 36 are greatly accentuated.

As another variation, the nonlinear resistance circuit 9 is used with other circuit components in a circuit for producing an output signal which is a third harmonic of an input signal. In such a circuit configuration, shown in FIGURE 5, a sine wave signal generator 51 has an output applied across a potentiometer 54 connected in parallel with a resistor 52 in series with the nonlinear resistor circuit 9'. A differential amplifier 53 receives two input signals and provides an output signal equal to the difference of the two input signals. A first input signal 56 is an attenuated input sine wave obtained from a potentiometer 54. A second input signal 57 is obtained from the juncture of the nonlinear resistor 9' and the resistor 52. Such second signal has an approximate triangular waveshape as produced by distorting the input sine wave with the nonlinear resistor. The resultant triangular wave 57 has a high degree of third harmonic component. The fundamental frequency portion of the triangular wave 57 is cancelled in the differential amplifier by the sine wave 56, leaving the third harmonic portion at the output 58 of the differential amplifier 53. Since no tuned circuits are involved, the circuit is not frequency sensitive. In one embodiment of the frequency tripler, an input frequency range from one cycle per second to 100 kilocycles per second was obtained.

In all the uses of the invention described up to here, the bias voltage applied to the gate terminal of the transistor 13 has been a steady state potential. However, it is very useful in some circuits to modulate the bias, potential, as in the circuit shown in FIGURE 6 where automatic constant output level control is obtained for an amplifier.

As shown in FIGURE 6, input signals are applied to an input terminal 61 and coupled to the input of an amplifier 62 through the source and drain terminals of a field-effect transistor 63. To provide automatic output level control, a light bulb 67 is connected to the output terminal 66 and provides a light intensity dependent upon the amplifier 62 output power. A light sensitive resistor 68, such as a cadmium-sulfide cell, is disposed adjacent the light bulb 67 and characteristically has a decrease in resistance with an increase in illumination. The light sensitive resistor, in series with a loading resistor 71, is connected across a power source 69. The voltage across the load resistor 71, which varies inversely with that across the light sensitive resistor 68, is applied as bias to the transistor 63 from the gate terminal to the anodes of two diodes 72 and 73 which have cathodes connected to the source and drain terminals of the transistor 63.

In the operation of the circuit of FIGURE 6, if the output level at the amplifier 62 should increase, the light from the light bulb 67 increases, decreasing the resistance of the light sensitive resistor 68 and increasing the potential across the load resistor 71. The resistance of the nonlinear resistor is thus caused to increase owing to the increase in negative bias applied thereto, and the amplitude of the input signal level applied to the amplifier 62 is reduced accordingly to compensate for the original increase in the amplifier output signal amplitude. The inverse function occurs with a decrease in the output signal, thereby maintaining the output signal level essentially constant.

In a typical nonlinear resistance circuit, for a low level input signal the resistance of the circuit can be made to vary from 1.33 thousand ohms to 33.3 thousand ohms near the origin by varying the bias applied to the gate terminal of the transistor 63.

Obviously many other variations are possible in the circuit. For instance, the bias voltage between the gate terminal of the transistor and the anodes of the diodes need not be the same for each diode. That is, a separate bias potential source can be provided between the anode of each diode and the gate terminal. In such circuit, asymmetrical voltage-current curves are obtainable. As a function generator, such a circuit can provide many variations in output signal shape.

Thus, while the invention has been disclosed with respect to specific embodiments, it will be apparent to those skilled in the art that numerous variations and modifications may be made within the spirit and scope of the invention and it is not intended to limit the invention except as defined in the following claim.

What is claimed is:

In a nonlinear resistance circuit utilized to provide frequency tripling, the combination comprising:

(a) a field effect transistor having a drain and source and gate terminals, (b) a first diode having a cathode connected to said source and having an anode connected to said gate terminal, (c) a second diode having a cathode connected to said drain terminal and having an anode connected to said gate terminal, (d) means applying a negative bias to said gate terminal, (e) a sine wave signal generator, (f) a resistance connected in series with said source and drain terminals across the output of said signal generator, (g) a differential amplifier having a first input connected across the output of said generator and having a second input connected across said source and said drain terminals, and (h) an amplitude adjusting means for matching the amplitude of input signals applied to said differential amplifier.

References Cited

UNITED STATES PATENTS

| | | | |
|---|---|---|---|
| 2,544,211 | 3/1951 | Barton | 323—94 X |
| 2,763,832 | 9/1956 | Shockley | 323—94 |
| 2,779,897 | 1/1957 | Ellis | 250—205 X |
| 2,920,265 | 1/1960 | Siedband. | |
| 2,988,688 | 6/1961 | Benton. | |
| 3,117,287 | 1/1964 | Damico | 330—86 |
| 3,153,152 | 10/1964 | Hoffman | 330—26 X |
| 3,200,329 | 8/1965 | Haisty | 323—94 |
| 3,205,458 | 9/1965 | Geery | 330—144 |
| 3,218,546 | 11/1965 | James et al. | |

JOHN F. COUCH, *Primary Examiner.*

A. D. PELLINEN, *Assistant Examiner.*